(12) United States Patent
Tang et al.

(10) Patent No.: US 11,489,617 B2
(45) Date of Patent: Nov. 1, 2022

(54) DATA TRANSMISSION METHOD AND COMMUNICATION DEVICE

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 144 days.

(21) Appl. No.: 16/836,502

(22) Filed: Mar. 31, 2020

(65) Prior Publication Data

US 2020/0287655 A1 Sep. 10, 2020

Related U.S. Application Data

(63) Continuation of application No. 16/503,578, filed on Jul. 4, 2019, now Pat. No. 10,651,968, which is a
(Continued)

(51) Int. Cl.
*H04L 1/00* (2006.01)
*H04W 76/27* (2018.01)
(Continued)

(52) U.S. Cl.
CPC .......... *H04L 1/0004* (2013.01); *H04L 1/0007* (2013.01); *H04L 1/0058* (2013.01);
(Continued)

(58) Field of Classification Search
CPC ... H04L 1/0004; H04L 1/0058; H04L 1/0643; H04L 1/0007; H04W 76/27; H04W 72/042
See application file for complete search history.

(56) References Cited

U.S. PATENT DOCUMENTS 8,537,750 B2 9/2013 Jin et al.
2004/0147269 A1* 7/2004 Kim ................... G01S 5/0054
455/456.2
(Continued)

FOREIGN PATENT DOCUMENTS

CN 103378924 10/2013
CN 103546253 A 1/2014
(Continued)

OTHER PUBLICATIONS

JPO, Office Action for JP Application No. 2019-536948, dated Jan. 22, 2021.
(Continued)

*Primary Examiner* — Charles C Jiang
*Assistant Examiner* — Thad N Defauw
(74) *Attorney, Agent, or Firm* — Hodgson Russ LLP

(57) ABSTRACT

Disclosed in the present application are a data transmission method and a communication device. The method includes: obtaining transmission parameters for transmitting a transport block, wherein the transmission parameters comprise Modulation and Coding Scheme (MCS), a Physical Resource Block (PRB) number, and PRB resource overhead information; determining a Transport Block Size (TBS) for the transport block according to the transmission parameters; and transmitting the transport block or receiving the transport block according to the TBS; wherein the PRB resource overhead information is determined based on at least one of: Demodulation Reference Signal (DMRS), Channel State Information-Reference Signals (CSI-RS), and control channel information.

6 Claims, 2 Drawing Sheets

Related U.S. Application Data continuation of application No. PCT/CN2017/070326, filed on Jan. 5, 2017.

(51) Int. Cl.
  *H04L 1/06* (2006.01)
  *H04W 72/04* (2009.01)

(52) U.S. Cl.
  CPC ......... *H04L 1/0643* (2013.01); *H04W 72/042* (2013.01); *H04W 76/27* (2018.02)

(56) References Cited

U.S. PATENT DOCUMENTS

| | | | |
|---|---|---|---|
| 2013/0329661 | A1 | 12/2013 | Chen et al. |
| 2014/0313985 | A1* | 10/2014 | Nimbalker ............ H04L 1/0061 370/329 |
| 2015/0117396 | A1* | 4/2015 | Wang .................... H04L 5/0091 370/330 |
| 2015/0156752 | A1* | 6/2015 | Liu ....................... H04L 5/0053 370/329 |
| 2015/0271802 | A1 | 9/2015 | Kang et al. |
| 2016/0036571 | A1 | 2/2016 | Park et al. |

FOREIGN PATENT DOCUMENTS

| | | |
|---|---|---|
| CN | 103547340 | 1/2014 |
| CN | 102196570 | 4/2014 |
| CN | 104065605 | 9/2014 |
| CN | 104365053 A | 2/2015 |
| CN | 105453672 | 3/2016 |
| CN | 108076527 A | 5/2018 |
| CN | 109076389 A | 12/2018 |
| EP | 2315369 | 4/2011 |
| EP | 2800415 | 5/2014 |
| EP | 3442256 | 2/2019 |
| JP | 2015510300 | 4/2015 |
| JP | 2015523019 | 8/2015 |
| RU | 2515605 | 5/2014 |
| RU | 2559898 | 8/2015 |
| WO | 2014005450 | 1/2014 |
| WO | 2014094294 | 6/2014 |
| WO | 2014180162 | 11/2014 |

OTHER PUBLICATIONS

IPI, Office Action for IN Application No. 201917028178, dated Jan. 25, 2021.
ILPO, Office Action for IL Application No. 267875, dated Jun. 2, 2021.
ISDEC, Office Action for CA Application No. 3049484, dated Aug. 12, 2020.
CMCC, "Designing the scaling factor of DwPTS for new special subframe configurations," 3GPP TSG-RAN WG1 #69, R1-122715, May 2012, 3 pages.
CMCC, "Discussion on the TBS scaling design," 3GPP TSG RAN WG1 Meeting #86, R1-167098, Aug. 2016, 3 pages.
LG Electronics, "System-level simulation results for reduced TTI length," 3GPP TSG RAN WG1 Meeting #84bis, R1-162503, Apr. 2016, 15 pages.
EPO, Office Action for EP Application No. 17890353.0, dated Nov. 7, 2019.
TIPO, Office Action for TW Application No. 106144944, dated Sep. 27, 2019.
ROSPatent, Office Action for RU Application No. 2019123739, dated Feb. 28, 2020.
Huawei et al., "On Supporting Larger TBS for UEs with Maximum 1.4MHz Bandwidth in TDD/HD-FDD," 3GPP TSG RAN WGI Meeting #86bis, R1-1608626, Oct. 2016, 3 pages.
Nokia et al., "Larger Maximum TBS for NB-IoT," 3GPP TSG RAN WG1 Meeting #86-bis, R1-1608889, Oct. 2016, 2 pages.
WIPO, ISR for PCT/CN2017/070326, dated Oct. 11, 2017.
INAPI Chile, First Office Action for CL 201901854, dated Oct. 1, 2020.
SIPO, FIrst Office Action for CN 201911328739.4, dated Nov. 2, 2020.
EPO, Extended European Search Report for EP Application No. 21179527.3, dated Sep. 8, 2021.
IPA, Examination Report for AU Application No. 2017391789, dated Sep. 9, 2021.
JPO, Notice of Allowance for JP Application No. 2019-536948, dated Oct. 12, 2021.
3GPP, "Technical Specification Group Radio Access Network; Evolved Universal Terrestrial Radio Access (E-UTRA); Physical Layer Procedures," TS 36.213 V14.1.0, Dec. 2016.

\* cited by examiner

200

DATA TRANSMISSION METHOD AND COMMUNICATION DEVICE

CROSS-REFERENCE TO RELATED APPLICATION

This application is a continuation of U.S. application Ser. No. 16/503,578, filed Jul. 4, 2019, which is a continuation of International Application No. PCT/CN2017/070326, filed Jan. 5, 2017, the entire disclosures of which are incorporated herein by reference.

TECHNICAL FIELD

Embodiments of the present disclosure relates to the technical field of wireless communication, and in particular, to a data transmission method and a communication device.

BACKGROUND

In a Long Term Evolution (LTE) system, when the network side schedules data transmission, Downlink Control Information (DCI) may carry Modulation and Coding Scheme (MCS) Information. Also, the network side and the terminal side previously agree a mapping relationship between MCS indicated by indication information and a Transport Block Size (TBS). The terminal device can know about the corresponding TBS for data transmission to and from the network device according to the indication information and the mapping relationship.

Currently, the correspondence between TBS, MCS, and PRB resources is determined under the assumption of a fixed resource overhead which includes resources occupied by the control channel and resources occupied by Cell-specific Reference Signals (CRS). However, in a 5G system, or know as a New Radio ("NR") system, there are many factors affecting the overhead, including: different resources occupied by the control channel; High Reliable and Low Latency Communications ("URLLC") traffic added into enhanced Mobile Broad Band ("eMBB") traffic; different Channel State Information-Reference Signals (CSI-RSs); the number of antenna ports (including the number of ports that are invisible to some terminals); a density of different Demodulation Reference Signals (DMRSs).

SUMMARY

Embodiments of the present application provide a data transmission method and a communication device.

In a first aspect, a data transmission method is provided, including: determining transmission parameters for transmitting a target transport block, wherein the transmission parameters includes target Modulation and Coding Scheme MCS, a target physical resource block PRB number, and information about a PRB resource overhead; determining a target transport block size TBS of the target transport block according to the transmission parameters; and transmitting the target transport block or receiving the target transport block according to the target TBS.

Optionally, in an implementation of the first aspect, the information about the PRB resource overhead includes a target PRB resource overhead of the target transport block, and the target PRB resource overhead includes among all PRBs with the target PRB number, a number of resource elements REs that are not used for transmitting the target transport block, or an average number of REs that are not used for transmitting the target transport block in each PRB.

Optionally, in an implementation of the first aspect, determining a target transport block size TBS of the target transport block according to the transmission parameters includes: determining a resource overhead group corresponding to the target PRB number according to a first mapping relationship and the target PRB number among a plurality of PRB numbers which corresponds to the target MCS, wherein the first mapping relationship represents a correspondence between a plurality of PRB numbers and a plurality of groups of resource overheads; and determining, among a plurality of TBSs corresponding to a plurality of resource overheads in the resource overhead group, a TBS corresponding to the target PRB resource overhead as the target TBS.

Here, the transmission parameters determined by the terminal device includes a target MCS, a target PRB number, and a target PRB resource overhead. The PRB number configured for different MCSs may be the same or different, and each MCS may correspond to a plurality of PRB numbers. Each of the plurality of PRB numbers may correspond to one PRB resource overhead group, and each of the PRB resource overhead groups includes at least one PRB resource overhead, and the at least one PRB resource overhead in each PRB resource group has a TBS corresponding to the at least one PRB resource overhead.

Optionally, in an implementation of the first aspect, determining a target transport block size TBS of the target transport block according to the transmission parameters includes: determining a resource overhead group corresponding to the target PRB number according to a first mapping relationship and the target PRB number among a plurality of PRB numbers which corresponds to the target MCS, wherein the first mapping relationship represents a correspondence between a plurality of PRB numbers and a plurality of groups of resource overheads; determining, among a plurality of resource overheads in the resource overhead group, at least one resource overhead larger than or equal to the target PRB resource overhead; and determining a TBS corresponding to the minimum resource overhead of the at least one resource overhead as the target TBS.

Optionally, in an implementation of the first aspect, the information about the PRB resource overhead includes a ratio of the target PRB resource overhead, and the ratio of the target PRB resource overhead includes a ratio of the number of the REs that are not used for transmitting the data in all PRBs with the target PRB number against the total number of the REs in all PRBs, or a ratio of an average number of REs that are not used for transmitting the data in each PRB against a total number of REs in each PRB.

Optionally, in an implementation of the first aspect, determining a target transport block size TBS of the target transport block according to the transmission parameters includes: determining a first PRB number according to the target PRB number and the ratio of the target PRB resource overhead; and determining a TBS corresponding to the first PRB number as the target TBS according to a second mapping relationship and the first PRB number among a plurality of PRB numbers which corresponds to the target MCS, wherein the second mapping relationship represents a correspondence between a plurality of PRB numbers and a plurality of TBSs.

Optionally, in an implementation of the first aspect, determining a first PRB number according to the target PRB number and the ratio of the target PRB resource overhead includes: determining the first PRB number as $\lfloor (1-P) \times N \rfloor$ according to the target PRB number and the ratio of the target PRB resource overhead, where N denotes the target PRB number, P denotes the ratio of the target PRB resource overhead, and $\lfloor . \rfloor$ denotes rounded down.

Optionally, in an implementation of the first aspect, the method is performed by a terminal device, and before the transmission parameters for transmitting the target transport block is determined, the method further includes: receiving, by the terminal device, the transmission parameters sent by a network device.

Optionally, in an implementation of the first aspect, the method is performed by a network device, and after the transmission parameters for transmitting the target transport block is determined, the method further includes: transmitting, by the network device, the transmission parameters to a terminal device.

In a second aspect, a communication device is provided. The communication device can perform the operations of the first aspect or any of the alternative implementations of the first aspect described above. In particular, the communication device may include modular units for performing the operations of any of the above-described first aspects or any of the possible implementations of the first aspect.

In a third aspect, a communication device is provided, the communication device including: a processor, a transceiver, and a memory. The processor, the transceiver, and the memory communicate with each other through an internal connection path. The memory is used for storing instructions, and the processor is used for executing instructions stored by the memory. When the processor executes the instructions stored by the memory, the execution causes the communication device to perform the method of the first aspect or any possible implementation of the first aspect, or the execution causes the communication device to implement the communication device provided in the second aspect.

In a fourth aspect, a computer readable storage medium is provided. The computer readable storage medium stores a program which causes a communication device to perform the data transmission method in the first aspect and any implementation of the first aspect.

In a fifth aspect, a system chip is provided. The system chip includes an input interface, an output interface, a processor, and a memory. The processor is configured to execute instructions stored in the memory, and when the instructions are executed, the processor can implement any method in the above first aspect and any of its various implementations.

According to a sixth aspect, a data transmission method is provided. The method includes:

obtaining transmission parameters for transmitting a transport block, wherein the transmission parameters comprise Modulation and Coding Scheme (MCS), a Physical Resource Block (PRB) number, and PRB resource overhead information;

determining a Transport Block Size (TBS) for the transport block according to the transmission parameters; and transmitting the transport block or receiving the transport block according to the TBS;

wherein the PRB resource overhead information is determined based on at least one of: Demodulation Reference Signal (DMRS), Channel State Information-Reference Signals (CSI-RS), and control channel information.

According to a seventh aspect, a communication device is provided. The communication device includes a processor, a transceiver, and a memory, wherein the processor is configured to execute instructions stored by the memory;

wherein when the processor executes the instructions stored in the memory, the communication device is caused to obtain transmission parameters for transmitting a transport block, wherein the transmission parameters comprise Modulation and Coding Scheme (MCS), a Physical Resource Block (PRB) number, and PRB resource overhead information;

determine a Transport Block Size (TBS) for the transport block according to the transmission parameters; and transmit the transport block or receive the transport block according to the TBS;

wherein the PRB resource overhead information is determined based on at least one of: Demodulation Reference Signal (DMRS), Channel State Information-Reference Signals (CSI-RS), and control channel information.

According to an eighth aspect, a chip is provided. The chip includes an input interface, an output interface, and a processor, wherein the processor is configured to:

obtain transmission parameters for transmitting a transport block, wherein the transmission parameters comprise Modulation and Coding Scheme (MCS), a Physical Resource Block (PRB) number, and PRB resource overhead information;

determine a Transport Block Size (TBS) for the transport block according to the transmission parameters; and instruct a transceiver to transmit the transport block or receive the transport block according to the TBS;

wherein the PRB resource overhead information is determined based on at least one of: Demodulation Reference Signal (DMRS), Channel State Information-Reference Signals (CSI-RS), and control channel information.

DETAILED DESCRIPTION

The technical solutions in the embodiments of the present application will be described below with reference to the accompanying drawings.

It should be understood that the technical solutions of the embodiments of the present application can be applied to various communication systems, for example, a Global System of Mobile Communication ("GSM") system, a Code Division Multiple Access ("CDMA") System, a Wideband Code Division Multiple Access ("WCDMA") system, a Long Term Evolution ("LTE") system, a LTE Frequency Division Duplex ("FDD") System, LTE Time Division Duplex ("TDD"), a Universal Mobile Telecommunication System ("UMTS"), and future 5G communication systems, etc.

The present application describes various embodiments in connection with a terminal device. The terminal device may also be referred to as User Equipment ("UE"), an access terminal, a subscriber unit, a subscriber station, a mobile station, a mobile platform, a remote station, a remote terminal, a mobile device, a user terminal, a terminal, a wireless communication device, user agent or user device. The access terminal may be a cellular phone, a cordless phone, a Session Initiation Protocol ("SIP") phone, a Wireless Local Loop ("WLL") station, or a personal digital assistant ("PDA"), a handheld device with wireless communication capabilities, a computing device or other processing device connected to a wireless modem, an in-vehicle device, a wearable device, a terminal device in a future 5G network, or a terminal device in a future evolved PLMN network, etc.

The present application describes various embodiments in connection with a network device. The network device may be a device for communicating with the terminal device, for example, may be a base station (Base Transceiver Station, abbreviated as "BTS") in a GSM system or CDMA, or may be a base station (NodeB, referred to as "NB") in the WCDMA system, or may also be an evolved base station (Evolutional Node B, "eNB" or "eNodeB") in a LTE system. Alternatively, the network device may be a relay station, an access point, an in-vehicle device, a wearable device, and a network side device in a future 5G network or a network side device in a future evolved PLMN network, etc.

Figure 1:
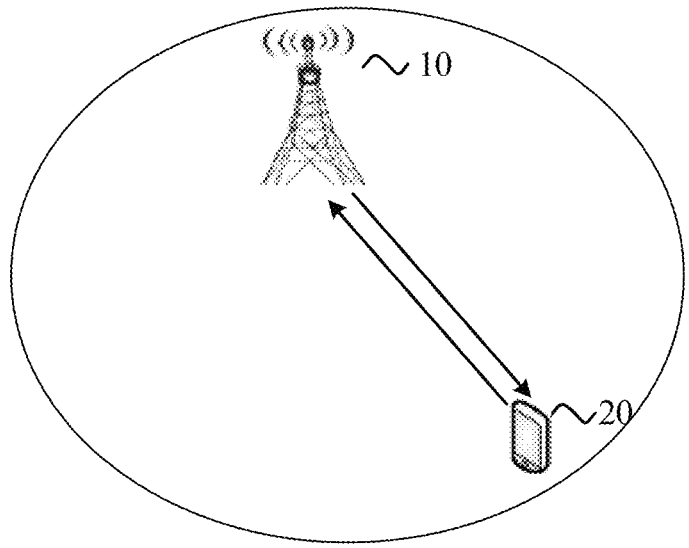
FIG. 1 is a schematic structural diagram of an application scenario of an embodiment of the present application.

FIG. 1 is a schematic diagram of an application scenario of an embodiment of the present application. The communication system in FIG. 1 may include a network device 10 and a terminal device 20. The network device 10 is configured to provide communication services for the terminal device 20 and access the core network. The terminal device 20 can access the network by searching for synchronization signals, broadcast signals, and the like transmitted by the network device 10, thereby performing communication with the network. The arrow shown in FIG. 1 may represent an uplink transmission/downlink transmission by a cellular link between the terminal device 20 and the network device 10.

The network in the embodiments of the present application may refer to a Public Land Mobile Network ("PLMN") or a Device to Device ("D2D") network or a Machine to Machine/Man ("M2M") network or other network. FIG. 1 is only a simplified illustrative diagram of an example, and the network may also include other terminal devices, which are not shown in FIG. 1.

Figure 2:
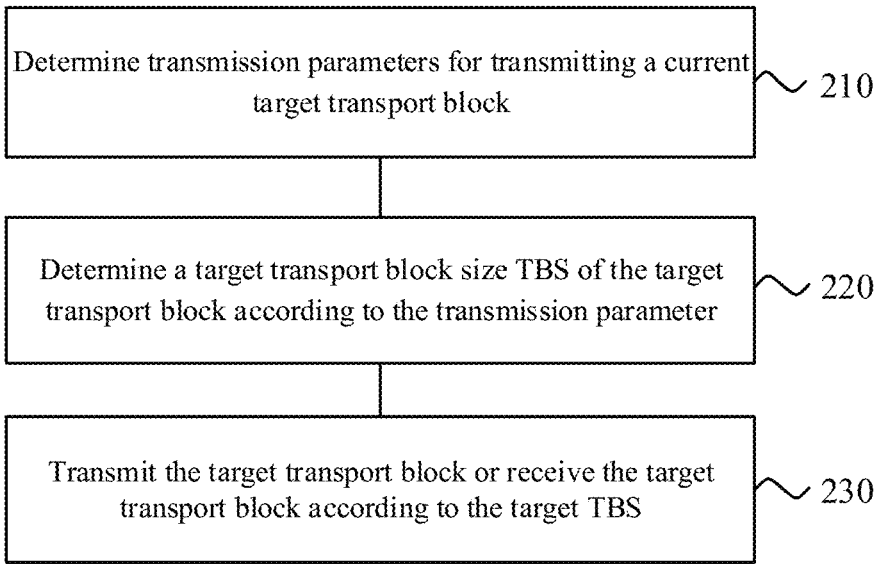
FIG. 2 is a schematic flowchart of a data transmission method according to an embodiment of the present application.

FIG. 2 is a flow chart of a method 200 for transmitting data according to an embodiment of the present application. The method 200 may be performed by a terminal device or a network device, etc. In the following description, for example, the method is performed by the terminal device, but the application is not limited thereto, and the method may also be performed by the network device, and the network device can also determine the TBS by using the method described in this embodiment of the present application. As shown in FIG. 2, the specific process for transmitting data includes the following steps.

At 210, transmission parameters for transmitting a target transport block is determined.

The transmission parameters includes target Modulation and Coding Scheme (MCS), a target physical resource block PRB number, and information about the PRB resource overhead.

Specifically, transmission parameters for transmitting a target transport block determined by the terminal device includes not only the target MCS and the corresponding target PRB number, but also the information about the PRB resource overhead. The target MCS may also include other information that has a fixed correspondence with the MCS, such as a MCS level or a MCS index. The information about the PRB resource overhead includes a target PRB resource overhead of the target transport block, or a ratio of the target PRB resource overhead.

The target PRB resource overhead includes among all PRBs with the target PRB number, a number of resource elements REs that are not used for transmitting the target transport block, or an average number of REs that are not used for transmitting the target transport block in each PRB.

The ratio of the target PRB resource overhead includes a ratio of the number of the REs that are not used for transmitting the data in all PRBs with the target PRB number against the total number of the REs in all PRBs, or a ratio of an average number of REs that are not used for transmitting the data in each PRB against a total number of REs in each PRB.

For example, the target PRB number is M. If the number of REs in the M PRBs that are not used for transmitting the data is N, the target PRB resource overhead is N, and the ratio of the target PRB resource overhead is N/M.

If the total number of REs in each of the M PRBs is P, and the number of REs in the PRB that are not used for transmitting the data is Q, the target PRB resource overhead may be defined as Q, and the ratio of the target PRB resource overhead is Q/P.

At 220, a target TBS of the target transport block is determined according to the transmission parameters.

Specifically, after determining the information of the target MCS level, the target PRB number, and the PRB resource overhead, the terminal device determines the size of the target transport block for transmitting the data according to the transmission parameters. In an embodiment of the present application, a new transmission parameters, that is, information about the PRB resource overhead, is introduced. In the following, in combination with the information about the PRB resource overhead, how the terminal device determines the TBS of the target transport block according to the transmission parameters will be described.

Scenario 1

The information about the PRB resource overhead includes a target PRB resource overhead of the target transport block.

The terminal device may specifically determine the target TBS of the target transport block by the following two approaches, if the target PRB resource overhead is included in the transmission parameters acquired by the terminal device.

Approach 1

Determining the target TBS of the target transport block according to the transmission parameters by the terminal device includes: determining, by the terminal device, a resource overhead group corresponding to the target PRB number according to a first mapping relationship and the target PRB number among a plurality of PRB numbers which corresponds to the target MCS level, wherein the first mapping relationship represents a correspondence between a plurality of PRB numbers and a plurality of groups of resource overheads; and determining by the terminal device, among a plurality of TBSs corresponding to a plurality of resource overheads in the resource overhead group, a TBS corresponding to the target PRB resource overhead as the target TBS.

Specifically, the transmission parameters determined by the terminal device includes a target MCS, a target PRB number, and a target PRB resource overhead. The PRB number configured for different MCSs may be the same or different, and each MCS may correspond to a plurality of PRB numbers. Each of the plurality of PRB numbers may correspond to one PRB resource overhead group, and each of the PRB resource overhead groups includes at least one PRB resource overhead, and the at least one PRB resource overhead in each PRB resource group has a TBS corresponding to the at least one PRB resource overhead. The terminal device may determine the target TBS according to the target MCS, the target PRB number, the target PRB resource overhead, and the correspondence between these transmission parameters and TBSs.

TABLE 1

| MCS Index | PRB Number | Resource Overhead | TBS |
|---|---|---|---|
| $MCS_1$ | $N_1 = 1$ | $OH_1$ | $TBS_1$ |
| | | $OH_3$ | $TBS_3$ |
| | | ... | ... |
| | | $OH_{2k+1}$ | $TBS_{2k+1}$ |
| | $N_2 = 2$ | $OH_1$ | $TBS_1$ |
| | | $OH_2$ | $TBS_2$ |
| | | ... | ... |
| | | $OH_n$ | $TBS_n$ |
| | ... | ... | ... |
| | $N_n = 100$ | $OH_2$ | $TBS_2$ |
| | | $OH_4$ | $TBS_4$ |
| | | ... | ... |
| | | $OH_{2k}$ | $TBS_{2k}$ |

For example, Table 1 shows the mapping relationship among MCS indices, PRB numbers, PRB resource overheads, and TBSs. One MCS corresponding to a plurality of PRB numbers, such as $N_1=1$, $N_2=2$, ..., $N_k=100$, respectively indicates that the number of allocated PRBs is 1 PRB, 2 PRBs, ..., 100 PRBs. Each of the PRB numbers corresponds to one group of resource overheads, each group of resource overheads includes at least one resource overhead, such as $OH_1$, $OH_2$, ... $OH_n$, and at least one resource overhead in each group of resource overheads corresponds to at least one TBS. The resource overheads in the resource overhead groups corresponding to different PRB numbers may be the same, different, or partially different. In Table 1, the number of allocated PRBs for different MCSs may be different, and the resource overhead corresponding to the different PRB numbers may also be different.

For example, it is assumed that the target MCS in the transmission parameters determined by the terminal device is $MCS_1$, the target PRB number is $N_2$, and the target PRB resource overhead is $OH_2$. The terminal device first searches for the target PRB number $N_2$ among the plurality of PRB numbers corresponding to the $MCS_1$, and then searches for the target PRB resource overhead $OH_2$ in one group of resource overheads (i.e., $OH_1, OH_2, ... OH_n$) corresponding to $N_2$, and finally the terminal device determines the $TBS_2$ corresponding to $OH_2$ is the target TBS.

Approach 2

Determining, by the terminal device, the target TBS of the target transport block according to the transmission parameters includes: determining, by the terminal device, a resource overhead group corresponding to the target PRB number according to a first mapping relationship and the target PRB number among a plurality of PRB numbers which corresponds to the target MCS level, wherein the first mapping relationship represents a correspondence between a plurality of PRB numbers and a plurality of groups of resource overheads; the terminal device determining, among a plurality of resource overheads in the resource overhead group, at least one resource overhead larger than or equal to the target PRB resource overhead; and determining, by the terminal device, a TBS corresponding to the minimum resource overhead of the at least one resource overhead as the target TBS.

Specifically, the transmission parameters determined by the terminal device includes a target MCS, a target PRB number, and a target PRB resource overhead. In a case where the terminal device does not find the target PRB resource overhead in at least one resource overhead in the resource overhead group corresponding to the target PRB number, the terminal device may determine the target TBS by the approach 2. For example, the terminal device may determine, among a plurality of resource overheads in the resource overhead group, at least one resource overhead larger than or equal to the target PRB resource overhead, and the terminal device may determine a TBS corresponding to the minimum resource overhead in the at least one resource overhead as the target TBS.

For example, Table 2 shows the mapping relationship among MCS indices, PRB numbers, PRB resource overheads, and TBSs. The MCS indices shown in Table 2 is $MCS_{15}$, and the $MCS_{15}$ corresponds to a plurality of PRB numbers such as $N_1=10$, ..., $N_k=20$. Each of the PRB numbers in turn corresponds to one group of resource overheads, and at least one resource overhead in the plurality of groups of resource overheads may be partially different. For example, when the PRB number is $N_1=10$, the corresponding resource overhead group includes three resource overheads 6, 12, and 18, and when the PRB number is $N_2=20$, the corresponding resource overhead group includes three resource overheads 6, 9, and 12. Here, a plurality of groups of resource overheads means a plurality of resource overhead groups.

TABLE 2

| MCS Index | PRB Number | Resource Overhead | TBS |
|---|---|---|---|
| 15 | $N_1 = 10$ | $OH_1 = 6$ | $TBS_1$ |
| | | $OH_2 = 12$ | $TBS_2$ |
| | | $OH_3 = 18$ | $TBS_3$ |
| | ... | ... | ... |
| | $N_2 = 20$ | $OH_4 = 6$ | $TBS_4$ |
| | | $OH_5 = 9$ | $TBS_5$ |
| | | $OH_6 = 12$ | $TBS_6$ |

For example, it is assumed that the index of the target MCS in the transmission parameters acquired by the terminal device is 15, and the target PRB number is $N_1=10$, and the target PRB resource overhead is 8. The terminal device first searches for the target PRB number $N_1=10$ in a plurality of PRB numbers corresponding to the MCS with an index of 15, and then searches for at least one resource overhead (i.e. $OH_2=12$ and $OH_3=18$) larger than the target PRB resource overhead 8, in the group of resource overheads (that is, $OH_1$, $OH_2$ 和 $OH_3$) corresponding to $N_1=10$. Finally, the terminal device determines the minimum resource overhead of $OH_2=12$ and $OH_3=18$ is $OH_2=12$. Then, the terminal device determines $TBS_2$ corresponding to $OH_2=12$ is the target TBS according to the correspondence between the resource overheads and TBSs.

For another example, assuming that the index of the target MCS in the transmission parameters acquired by the terminal device is 15, the target PRB number is $N_2=20$, and the target PRB resource overhead is 8. The terminal device finds a resource overhead larger than the target PRB resource overhead 8 in the group of resource overheads (i.e., $OH_4$, $OH_5$, and $OH_6$) corresponding to $N_2=20$, that is, $OH_5=9$ and $OH_6=12$. Finally the terminal device determines the minimum resource overhead in $OH_5=9$ and $OH_6=12$ is $OH_5=9$. Then, the terminal device determines $TBS_2$ corresponding to $OH_5=9$ is the target TBS according to the correspondence between the resource overheads and TBSs.

It should be understood that the terminal device may determine, in the plurality of resource overheads in the resource overhead group, at least one resource overhead that is less than or equal to the target PRB resource overhead, and determine a TBS corresponding to the maximum resource overhead of the at least one resource overhead, which is not limited in the embodiment of the present disclosure.

Scenario 2

The information about the PRB resource overhead includes a ratio of the target PRB resource overhead of the target transport block.

Optionally, determining, by the terminal device, the target TBS of the target transport block according to the transmission parameters includes: determining by the terminal device a first PRB number according to the target PRB number and the ratio of the target PRB resource overhead; and the terminal device determining a TBS corresponding to the first PRB number as the target TBS according to a second mapping relationship and the first PRB number among a plurality of PRB numbers which corresponds to the target MCS, wherein the second mapping relationship represents a correspondence between a plurality of PRB numbers and a plurality of TBSs.

In a LTE system, the system bandwidth is at most 100 PRBs. Therefore, in the mapping relationship among MCSs, PRB numbers, and TBSs, there are at most 100 PRBs for one MCS. In a 5G system, the system bandwidth may be much wider than that in the LTE system. For example, it may be 200M bandwidth (corresponding to 1000 PRBs). If the mapping relationship table is constructed by using the original manner, for example, Table 3, it will cause a very large overhead.

If the transmission parameters determined by the terminal device includes a ratio of the target PRB resource overhead, the terminal device may determine the first PRB number according to the target PRB number and the ratio of the target PRB resource overhead. The terminal device searches for the first PRB number in the plurality of PRB numbers corresponding to the target MCS, and determines a TBS corresponding to the first PRB number, according to the first PRB number and the correspondence between a plurality of PRB numbers and a plurality of TBSs.

TABLE 3

| MCS Index | PRB Number | TBS |
|---|---|---|
| 25 | 1 | $TBS_1$ |
|  | 2 | $TBS_2$ |
|  | ... | ... |
|  | 100 | $TBS_{100}$ |

Optionally, the terminal device may determine the first PRB number according to a certain preset rule, for example, the first PRB number is $M=\lfloor(1-P)\times N\rfloor$, where M denotes the first PRB number, N denotes the target PRB number, P denotes the ratio of the target PRB resource overhead, and $\lfloor.\rfloor$ denotes rounded down.

Taking the mapping relationship shown in Table 3 as an example, the transmission parameters determined by the terminal device include the target MCS, the target PRB number, and the target PRB resource overhead. Assuming that the index of the target MCS in the transmission parameters is 25, the target PRB number is 90, and the ratio of target PRB resource overhead is 8%, the terminal device may determine, according to the target PRB number and the target PRB resource overhead, that the first PRB number is $M=\lfloor(1-8\%)\times 90\rfloor=82$, so that the terminal device searches for the PRB number among 82 in the PRB numbers corresponding to the MCS with an index of 25, and a TBS corresponding to the PRB number 82 is the target TBS.

In this embodiment, it is not necessary to modify the original mapping relationship table, and the required TBS can be determined based on different PRB resource overheads.

At 230, the target transport block is transmitted or the target transport block is received according to the target TBS.

Specifically, after the terminal device determines the target TBS for transmitting the target transport block, the target transport block of the corresponding size may be generated based on the target TBS and the target transport block may be transmitted to the network device or the target transport block sent by the network device may be received according to the target TBS.

The method 200 described above can also be performed by a network device. That is, the network device determines transmission parameters for transmitting a target transport block, wherein the transmission parameters includes a target MCS, a target PRB number, and information on PRB resource overhead. The network device determines a TBS of the target transport block according to the transmission parameters. The network device transmits the target transport block to the terminal device according to the target TBS or receives the target transport block sent by the terminal device. It should be understood that the detailed process of determining the TBS of the transport block for transmitting the current data by the network device may refer to the foregoing process of determining the TBS by the terminal device, and for brevity, repeated details are not provided herein.

Optionally, if the method is performed by the terminal device, before the terminal device determines the transmission parameters for transmitting the target transport block, the method further includes: receiving by the terminal device the transmission parameters sent by the network device.

Optionally, if the method is performed by the network device, after the transmission parameters for transmitting the target transport block is determined, the method further includes: transmitting, by the network device, the transmission parameters to the terminal device.

Here, the network device may send the transmission parameters through the physical layer signaling, for example, send the transmission parameters carried in the downlink control information ("DCI") to the terminal device. However, the resource overhead may not change too quickly since the resource overhead may be caused by system overhead, such as Channel State Information-Reference Signals ("CSI-RS") and control channels. Therefore, the network device can also indicate the target resource overhead to the terminal device through high layer signaling, such as Radio Resource Control ("RRC") signaling.

In the embodiment of the present application, the terminal device and the network device determine the TBS of the target transport block for transmitting the current data by combining the information about the PRB resource overhead, and can determine the TBS information used for the data transmission based on different resource overheads, which can increase flexibility of the system.

Figure 3:
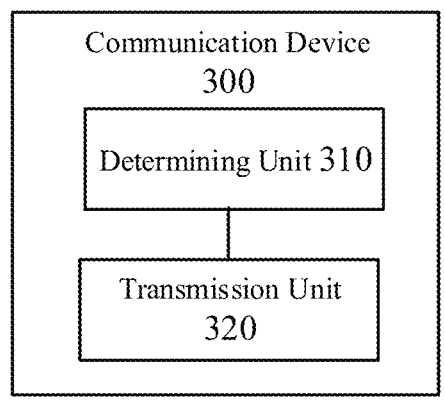
FIG. 3 is a schematic block diagram of a communication device according to an embodiment of the present application.

FIG. 3 is a schematic block diagram of a communication device 300 according to an embodiment of the present application. The communication device 300 is a terminal device or a network device. As shown in FIG. 3, the communication device 300 includes a determining unit 310 and a transmission unit 320.

The determining unit 310 is configured to determine transmission parameters for transmitting a target transport block. The transmission parameters includes target Modulation and Coding Scheme MCS, a target physical resource block PRB number, and information about a PRB resource overhead.

The determining unit 310 is further configured to determine a target transport block size TBS of the target transport block according to the transmission parameters.

The transmission unit 320 is configured to transmit the target transport block or receive the target transport block according to the target TBS determined by the determining unit 310.

Therefore, the terminal device and the network device determine the TBS of the target transport block for transmitting the current data by combining the information about the PRB resource overhead, and can determine the TBS information used for the data transmission based on different resource overheads, which can increase flexibility of the system.

Optionally, the information about the PRB resource overhead includes a target PRB resource overhead of the target transport block, wherein the target PRB resource overhead includes among all PRBs with the target PRB number, a number of resource elements REs that are not used for transmitting the target transport block, or an average number of REs that are not used for transmitting the target transport block in each PRB.

Optionally, the determining unit 310 is specifically configured to determine a resource overhead group corresponding to the target PRB number according to a first mapping relationship and the target PRB number among a plurality of PRB numbers which corresponds to the target MCS, wherein the first mapping relationship represents a correspondence between a plurality of PRB numbers and a plurality of groups of resource overheads; and determine, among a plurality of TBSs corresponding to a plurality of resource overheads in the resource overhead group, a TBS corresponding to the target PRB resource overhead as the target TBS.

Optionally, the determining unit 310 is specifically configured to determine a resource overhead group corresponding to the target PRB number according to a first mapping relationship and the target PRB number among a plurality of PRB numbers which corresponds to the target MCS, wherein the first mapping relationship represents a correspondence between a plurality of PRB numbers and a plurality of groups of resource overheads; determine, among a plurality of resource overheads in the resource overhead group, at least one resource overhead larger than or equal to the target PRB resource overhead; and determine a TBS corresponding to the minimum resource overhead of the at least one resource overhead as the target TBS.

Optionally, the information about the PRB resource overhead includes a ratio of the target PRB resource overhead, wherein the ratio of the target PRB resource overhead includes a ratio of the number of the REs that are not used for transmitting the data in all PRBs with the target PRB number against the total number of the REs in all PRBs, or a ratio of an average number of REs that are not used for transmitting the data in each PRB against a total number of REs in each PRB.

Optionally, the determining unit 310 is specifically configured to determine a first PRB number according to the target PRB number and the ratio of the target PRB resource overhead; and determine a TBS corresponding to the first PRB number as the target TBS according to a second mapping relationship and the first PRB number among a plurality of PRB numbers which corresponds to the target MCS, wherein the second mapping relationship represents a correspondence between a plurality of PRB numbers and a plurality of TBSs.

Optionally, the determining unit 310 is specifically configured to determine the first PRB number as $\lfloor (1-P) \times N \rfloor$ according to the target PRB number and the ratio of the target PRB resource overhead, where N denotes the target PRB number, P denotes the ratio of the target PRB resource overhead, and $\lfloor . \rfloor$ denotes rounded down.

Optionally, the communication device is a terminal device, and the transmission unit 320 is further configured to receive the transmission parameters sent by the network device.

Optionally, the communication device is a network device, and the transmission unit 320 is further configured to send the transmission parameters to the terminal device.

It should be understood that the communication device 300 may correspond to the terminal device or the network device in the method embodiment, and may implement the corresponding functions of the terminal device or the network device. For brevity, no further details are provided herein.

Figure 4:
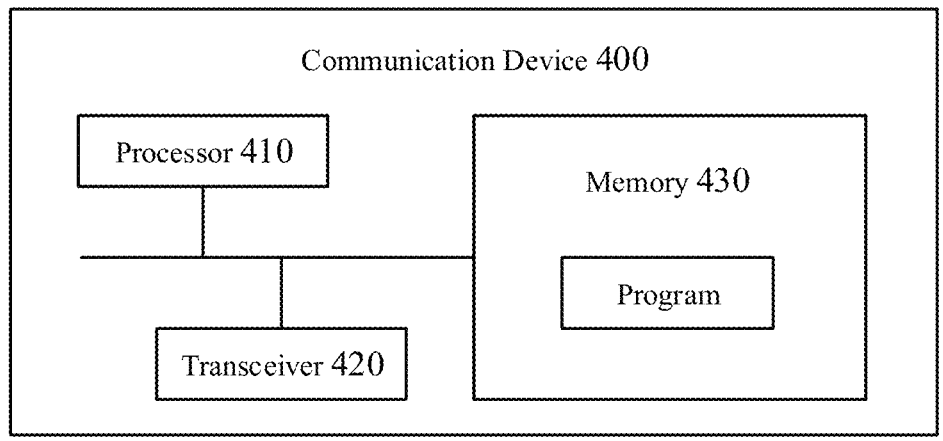
FIG. 4 is a schematic block diagram of a communication device according to an embodiment of the present application.

FIG. 4 is a schematic block diagram of a communication device 400 according to an embodiment of the present application. The communication device can be a terminal device or a network device. As shown in FIG. 4, the communication device includes a processor 410, a transceiver 420, and a memory 430, wherein the processor 410, the transceiver 420, and the memory 430 communicate with each other through an internal connection path. The memory 430 is configured to store instructions, and the processor 410 is configured to execute the instruction stored by the memory 430 to control the transceiver 420 to receive a signal or send a signal.

The processor 410 is configured to determine transmission parameters for transmitting a target transport block, wherein the transmission parameters includes target Modulation and Coding Scheme MCS, a target physical resource block PRB number, and information about a PRB resource overhead; and determine a target transport block size TBS of the target transport block according to the transmission parameters.

The transceiver 420 is configured to transmit the target transport block to the second device according to the target TBS determined by the processor 410, or receive the target transport block sent by the second device according to the target TBS.

Therefore, the terminal device and the network device determine the TBS of the target transport block for transmitting the current data by combining the information about the PRB resource overhead, and can determine the TBS information used for the data transmission based on different resource overheads, which can increase flexibility of the system.

Optionally, the information about the PRB resource overhead includes a target PRB resource overhead of the target transport block, wherein the target PRB resource overhead includes among all PRBs with the target PRB number, a number of resource elements REs that are not used for transmitting the target transport block, or an average number of REs that are not used for transmitting the target transport block in each PRB.

Optionally, the processor 410 is specifically configured to determine a resource overhead group corresponding to the target PRB number according to a first mapping relationship and the target PRB number among a plurality of PRB numbers which corresponds to the target MCS, wherein the first mapping relationship represents a correspondence between a plurality of PRB numbers and a plurality of groups of resource overheads; and determine, among a plurality of TBSs corresponding to a plurality of resource overheads in the resource overhead group, a TBS corresponding to the target PRB resource overhead as the target TBS.

Optionally, the processor 410 is specifically configured to determine a resource overhead group corresponding to the target PRB number according to a first mapping relationship and the target PRB number among a plurality of PRB numbers which corresponds to the target MCS, wherein the first mapping relationship represents a correspondence between a plurality of PRB numbers and a plurality of groups of resource overheads; determine, among a plurality of resource overheads in the resource overhead group, at least one resource overhead larger than or equal to the target PRB resource overhead; and determine a TBS corresponding to the minimum resource overhead of the at least one resource overhead as the target TBS.

Optionally, the information about the PRB resource overhead includes a ratio of the target PRB resource overhead, where the ratio of the target PRB resource overhead includes a ratio of the number of the REs that are not used for transmitting the data in all PRBs with the target PRB number against the total number of the REs in all PRBs, or a ratio of an average number of REs that are not used for transmitting the data in each PRB against a total number of REs in each PRB.

Optionally, the processor 410 is specifically configured to determine a first PRB number according to the target PRB number and the ratio of the target PRB resource overhead; and determine a TBS corresponding to the first PRB number as the target TBS according to a second mapping relationship and the first PRB number among a plurality of PRB numbers which corresponds to the target MCS, wherein the second mapping relationship represents a correspondence between a plurality of PRB numbers and a plurality of TBSs.

Optionally, the processor 410 is specifically configured to determine the first PRB number as $\lfloor (1-P) \times N \rfloor$ according to the target PRB number and the ratio of the target PRB resource overhead, where N denotes the target PRB number, P denotes the ratio of the target PRB resource overhead, and $\lfloor . \rfloor$ denotes rounded down.

Optionally, the communication device 400 is a terminal device, and the transceiver 420 is further configured to receive the transmission parameters sent by the network device.

Optionally, the communication device 400 is a network device, and the transceiver 420 is further configured to send the transmission parameters to the terminal device.

It should be understood that, in the embodiment of the present application, the processor 410 may be a central processing unit ("CPU"), and the processor 410 may also be other general-purpose processor, a digital signal processor (DSP), an application specific integrated circuit (ASIC), an field programmable gate array (FPGA) or other programmable logic device, a discrete gate or transistor logic device, a discrete hardware component, and the like. The general purpose processor may be a microprocessor or the processor or any conventional processor or the like.

The memory 430 can include a read only memory and a random access memory and provides instructions and data to the processor 410. A portion of the memory 430 may also include a non-volatile random access memory. For example, the memory 430 can also store information of the device type.

In the implementation process, each step of the foregoing method may be completed by an integrated logic circuit of hardware or an instruction in a form of software in the processor 410. The steps of the positioning method disclosed in the embodiment of the present application may be directly implemented by the hardware processor, or may be performed by a combination of hardware and software modules in the processor 410. The software module can be located in a storage medium well known in the art, such as random access memory, a flash memory, a read only memory, a programmable read only memory or an electrically erasable programmable memory, a register, and the like. The storage medium is located in the memory 430, and the processor 410 reads the information in the memory 430 and completes the steps of the above method in combination with its hardware. Repeated descriptions are omitted here.

The communication device 400 according to the embodiment of the present application may correspond to a terminal device or a network device for performing the method 200 in the above method 200, and a communication device 300 according to an embodiment of the present application. Each unit or module in the communication device 400 is configured to perform the operations or processes performed by the terminal device or the network device in the foregoing method 200. Here, in order to avoid redundancy, detailed description thereof is omitted.

Figure 5:
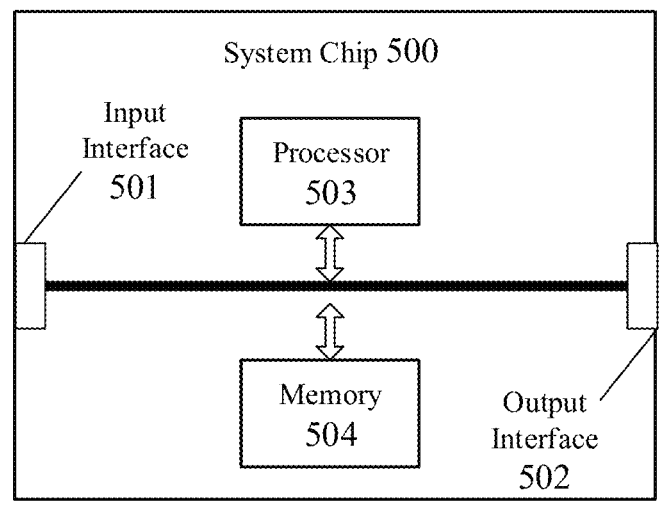
FIG. 5 is a schematic block diagram of a system chip according to an embodiment of the present application.

FIG. 5 is a schematic block diagram of a system chip according to an embodiment of the present application. The system chip 500 of FIG. 5 includes an input interface 501, an output interface 502, at least one processor 503, and a memory 504. The input interface 501, the output interface 502, the processor 503, and the memory 504 are interconnected by an internal connection path. The processor 503 is configured to execute codes in the memory 504. When the codes are executed, the processor 503 can implement the method performed by the terminal device and the network device in the method embodiment. For the sake of brevity, it will not be repeated here.

It should be understood that, in the various embodiments of the present application, the sequence numbers of the foregoing processes does not mean the order of execution sequence, and the execution order of each process should be determined by its function and internal logic, and should not constitute any limitation on the implementation process of the embodiments of the present application.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solutions. Those skilled in the art can use different methods to implement the described functions for each particular application, but such implementation should not be considered to be beyond the scope of the present application.

Those skilled in the art can clearly understand that for the convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the units is only a logical function division. In actual implementation, there may be another division manner, for example, a plurality of units or components may be combined or may be integrated into another system, or some features can be ignored or some steps may not be executed. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components displayed as units may or may not be physical units, that is, may be located in one place, or may be distributed to a plurality of network units. Some or all of the units may be selected according to actual needs to achieve the purpose of the solutions of the embodiments.

In addition, each functional unit in each embodiment of the present application may be integrated into one processing unit, or each unit may exist physically and separately, or two or more units may be integrated into one unit.

The functionalities, if implemented as a software functional unit and sold or used as a standalone product, can be stored on a computer readable storage medium. Based on such understanding, for the technical solution of the present application, the essential part or the part contributing over the prior art, or a part of the technical solution may be embodied in the form of a software product, which is stored in a storage medium, including instructions used to cause a computer device (which may be a personal computer, a server, or a network device, etc.) to perform all or part of the steps of the method of various embodiments of the present application. The foregoing storage medium includes a U disk, a mobile hard disk, a Read-Only Memory ("ROM"), a Random Access Memory ("RAM"), a magnetic disk, or an optical disk and other medium that can store program codes.

The above is only specific embodiments of the present application, but the scope of protection of the embodiments of the present application is not limited thereto. Variations or substitutions readily conceivable within the scope of the technology disclosed in the embodiments of the present application by any person skilled in the art should be covered within the scope of this application. Therefore, the scope of protection of the embodiments of the present application should be determined by the scope of protection of the claims.

What is claimed is:

1. A data transmission method, comprising:
    obtaining transmission parameters for transmitting a transport block, wherein the transmission parameters comprise Modulation and Coding Scheme (MCS), a Physical Resource Block (PRB) number, and PRB resource overhead information;
    determining a Transport Block Size (TBS) for the transport block according to the transmission parameters; and
    transmitting the transport block or receiving the transport block according to the TBS;
    wherein the PRB resource overhead information is determined based on at least one of: Demodulation Reference Signal (DMRS), Channel State Information-Reference Signals (CSI-RS), and control channel information;
    wherein the PRB resource overhead information is conveyed through physical layer Downlink Control Information (DCI) signaling and/or Radio Resource Control (RRC) signaling;
    wherein the PRB resource overhead information comprises a number of REs that are not used for transmitting the transport block in each PRB.

2. The method according to claim 1, wherein the PRB resource overhead information is determined based on CSI-RS and/or control channel information is conveyed through RRC signaling.

3. A communication device, comprising:
    a processor, a transceiver, and a memory;
    wherein the processor is configured to execute instructions stored by the memory;
    wherein when the processor executes the instructions stored in the memory, the communication device is caused to:
    obtain transmission parameters for transmitting a transport block, wherein the transmission parameters comprise Modulation and Coding Scheme (MCS), a Physical Resource Block (PRB) number, and PRB resource overhead information;
    determine a Transport Block Size (TBS) for the transport block according to the transmission parameters; and
    transmit the transport block or receive the transport block according to the TBS;
    wherein the PRB resource overhead information is determined based on at least one of: Demodulation Reference Signal (DMRS), Channel State Information-Reference Signals (CSI-RS), and control channel information;
    wherein the PRB resource overhead information is conveyed through physical layer Downlink Control Information (DCI) signaling and/or Radio Resource Control (RRC) signaling;
    wherein the PRB resource overhead information comprises a number of REs that are not used for transmitting the transport block in each PRB.

4. The communication device according to claim 3, wherein the PRB resource overhead information is determined based on CSI-RS and/or control channel information is conveyed through RRC signaling.

5. A chip, comprising:
    an input interface, an output interface, and a processor, wherein the processor is configured to:
    obtain transmission parameters for transmitting a transport block, wherein the transmission parameters comprise Modulation and Coding Scheme (MCS), a Physical Resource Block (PRB) number, and PRB resource overhead information;
    determine a Transport Block Size (TBS) for the transport block according to the transmission parameters; and
    instruct a transceiver to transmit the transport block or receive the transport block according to the TBS;
    wherein the PRB resource overhead information is determined based on at least one of: Demodulation Reference Signal (DMRS), Channel State Information-Reference Signals (CSI-RS), and control channel information;

wherein the PRB resource overhead information is conveyed through physical layer Downlink Control Information (DCI) signaling and/or Radio Resource Control (RRC) signaling;

wherein the PRB resource overhead information comprises a number of REs that are not used for transmitting the transport block in each PRB.

6. The chip according to claim 5, wherein the PRB resource overhead information is determined based on CSI-RS and/or control channel information is conveyed through RRC signaling.

* * * * *